US006199107B1

(12) United States Patent
Dujari

(10) Patent No.: US 6,199,107 B1
(45) Date of Patent: Mar. 6, 2001

(54) PARTIAL FILE CACHING AND READ RANGE RESUME SYSTEM AND METHOD

(75) Inventor: Rajeev Dujari, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/120,982

(22) Filed: Jul. 22, 1998

(51) Int. Cl.[7] .................................................. G06F 13/14
(52) U.S. Cl. ............................................. 709/219; 711/137
(58) Field of Search ..................................... 709/213, 216, 709/217, 219; 711/137

(56) References Cited

U.S. PATENT DOCUMENTS

| 5,390,318 | 2/1995 | Ramakrishnan et al. | 711/158 |
| 5,442,760 | 8/1995 | Rustad et al. | 712/215 |
| 5,628,015 | 5/1997 | Singh | 713/200 |
| 5,737,599 | 4/1998 | Rowe et al. | 707/104 |
| 5,787,470 | 7/1998 | DeSimone et al. | 711/124 |
| 5,787,475 | * 7/1998 | Pawlowski | 711/137 |
| 5,864,852 | 1/1999 | Luotonen | 713/201 |
| 5,889,958 | 3/1999 | Willens | 709/229 |
| 6,061,715 | * 5/2000 | Hawes | 709/203 |
| 6,067,565 | * 5/2000 | Horvitz | 709/218 |
| 6,085,226 | * 7/2000 | Horvitz | 709/203 |
| 6,112,231 | * 8/2000 | DeSimone et al. | 709/213 |

* cited by examiner

Primary Examiner—Kenneth R. Coulter
(74) Attorney, Agent, or Firm—Michalik & Wylie, PLLC

(57) ABSTRACT

A method and system for caching partial downloads of network content and using that cached partial content to satisfy requests for content from client applications, in a manner that is invisible to the application. A network interface receives a request for content corresponding to cached partial content, determines what portion is cached and what portion is missing, and requests from the server only the missing range of content. When the missing content is received in a partial range response, it is merged with the cached content to provide the full content requested. The interface further transforms the range response to a response that the application is expecting and is capable of handling. Benefits include reduced client latency, reduced server load and improved network utilization. In an alternate enhancement, the interface uses pointers to track client requests for content with the amount of content received and cached for that content, to give the application the illusion of having random access to the content.

22 Claims, 9 Drawing Sheets

```
GET /index.htm  HTTP/1.0
                    (Initial Request)
```
— 84

FIG. 4

```
200 HTTP/1.1
Accept-Ranges: bytes
Content-Length: 8000
Last-Modified: Tue, 14 Jul 1998 05:05:25 GMT
ETag: "xyz"
|
Data (Bytes 0-1999)
                    (Initial Response)
```
— 85

FIG. 5

```
GET /index.htm  HTTP/1.0
Unless-Modified-Since: Tue, 14 Jul 1998 05:05:25 GMT
If-Range: "xyz"
Range: bytes=2000-
                    (Range Request)
```
— 86

FIG. 6

```
206 HTTP/1.1
Content-Range:2000-7999/8000
Content-Length:6000
Last-Modified: Tue, 14 Jul 1998 05:05:25 GMT
ETag: "xzy"
|
Data (Range Response)
```

FIG. 7

```
200 HTTP/1.1
Accept-Ranges: bytes
Content-Length: 8000
Last-Modified: Tue, 14 Jul 1998 05:05:25 GMT
ETag: "xyz"
|
Data (Bytes 0-7999)
                      (Transformed Response)
```

FIG. 8

PARTIAL FILE CACHING AND READ RANGE RESUME SYSTEM AND METHOD

FIELD OF THE INVENTION

The invention relates generally to computer systems and the Internet, and more particularly to the downloading of network content.

BACKGROUND OF THE INVENTION

The downloading of network content is often interrupted for a number of reasons, such as the user clicking on another link during the download. With progressive rendering, where a browser receives portions of the content as it is downloaded to provide partial images thereof, the user may even interrupt the download by clicking on a link that appears on a page being displayed during the download. Other reasons for the interruption of downloads include busy servers, gateways and/or service providers dropping connections, and transmission problems or the like that cause a download to be aborted.

If a user later requests download of content that was previously interrupted, the request starts over at the beginning. In general, this is because few network applications are capable of dealing with anything other than a complete response to a request for content. However, while this system works, restarting requests from the beginning has the drawback of re-transmitting data that was already sent. This increases client latency, particularly when the client is communicating over a low-bandwidth connection, increases the load on the server and takes up available network resources (e.g., available bandwidth).

SUMMARY OF THE INVENTION

Briefly, the present invention provides a system and method of caching partial content and then using that cached content with a range of downloaded partial content to provide a complete response to a requesting application, in a manner that is essentially invisible to the application. To this end, a network interface stores partial server content in a local cache, and when it receives a request for server content corresponding to the partial content, determines one or more ranges of content data that are missing from the partial content. The interface requests the missing range (or ranges) of content data from the server, and when it receives the range data in response, merges the partial content in the cache with the range of content data received from the server. The interface transforms the response and the merged content into a full response including the entire amount of content requested by the application. Applications that let the user access content via a file-like interface may be given the illusion of random access to that content.

Other advantages will become apparent from the following detailed description when taken in conjunction with the drawings, in which:

BRIEF DESCRIPTION OF THE DRAWINGS

FIGS. 4 and 5 are representations of an initial request for content, and an initial response thereto having only a partial amount of the requested data, respectively;

FIGS. 6–8 are representations of a request for a range of content data, a response thereto comprising the requested range of partial content, and the range response transformed into a complete response, respectively, in accordance with an aspect of the present invention;

DETAILED DESCRIPTION

Exemplary Operating Environment

Figure 1:
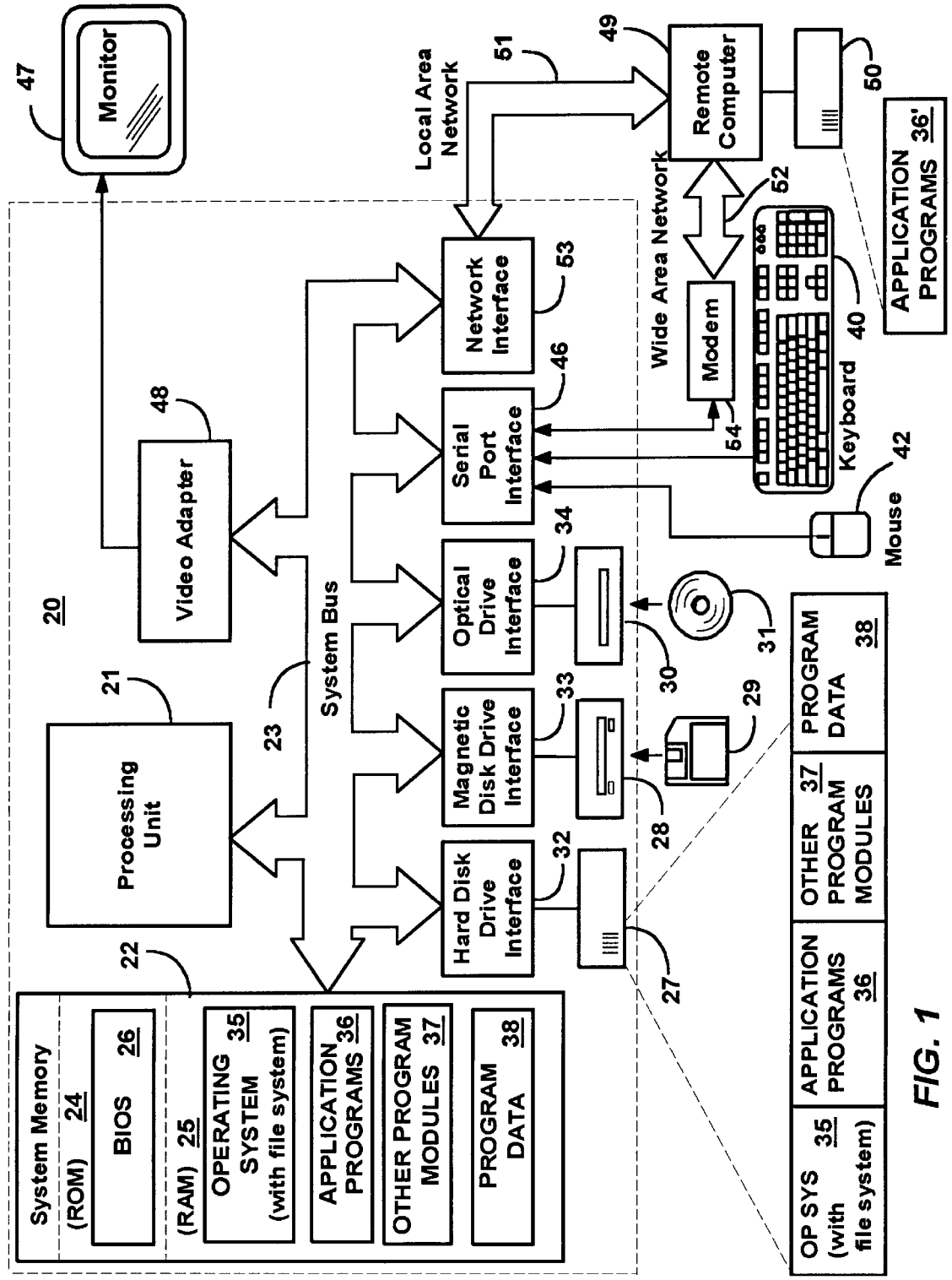
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35, (including a file system therein and/or associated therewith), one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Partial File Caching and Read Range Resume

Figure 2:
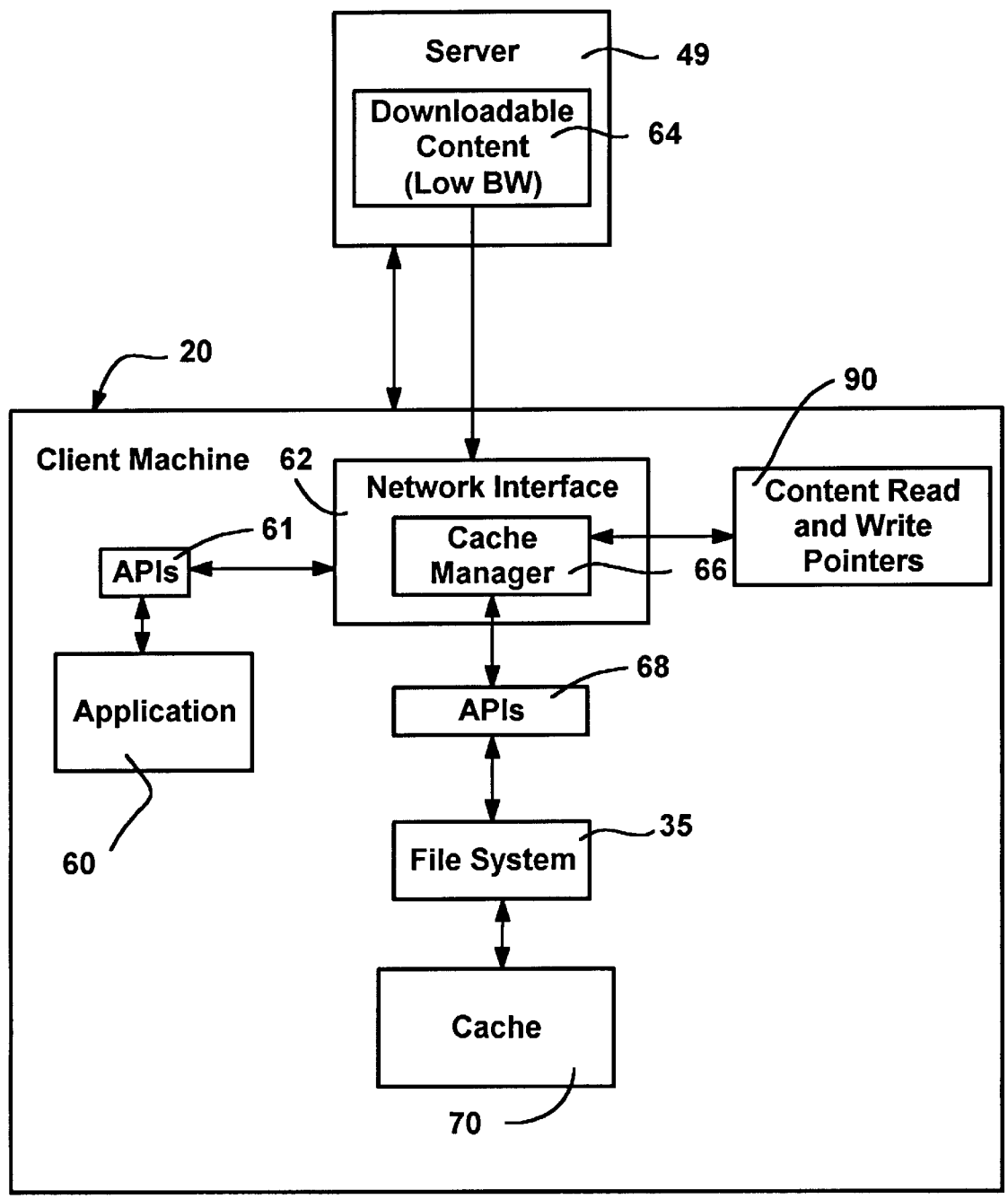
FIG. 2 is a block diagram representing a general conceptual model of the present invention.
Figure 3:
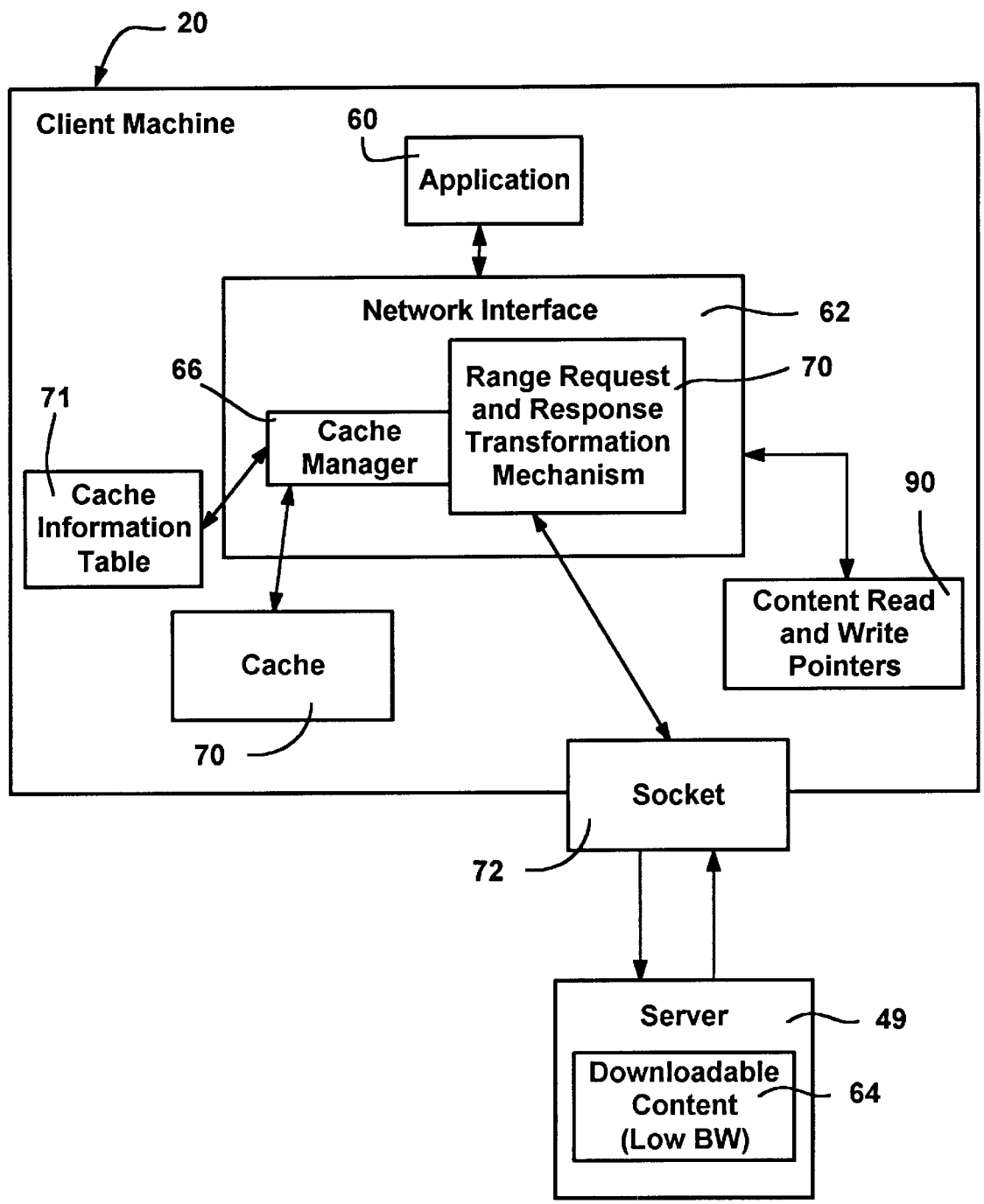
FIG. 3 is a block diagram generally representing various components for implementing the method and system of the present invention.

FIG. 2 shows a generalized conceptual model of the present invention wherein a network application 60 such as a browser in a client machine (e.g., the personal computer system 20) communicates via APIs 61 and a network interface 62 with a server (e.g., the remote computer 49) in order to download content 64 therefrom. Communication between the client 20 and the server 49 preferably uses a well-known network protocol, such as hypertext transfer protocol (HTTP), and the network interface 62 preferably comprises the Wininet.dll application programming interface. As used herein, "server" or "network server" includes any machine or combination of machines having content thereon. Network servers may thus include HTTP "web sites," including those having sites with different names (which may be regarded as different virtual servers even if they are hosted on the same physical machine). Note that a web site may be distributed over many virtual servers, which in turn may be distributed over many physical machines.

In any event, the network interface 62 includes or otherwise accesses a cache manager component 66 that includes code for caching some or all of the content 64, ordinarily via application programming interface (API) calls through APIs 68 to the operating/file system 35. For example, each distinctly-referenced portion of a server's content 64 may be stored as a file in one or more caches 70. Note that some or all of the various components referenced herein may be combined with or included within other components, while others may be separate from one another and be appropriately invoked as needed. For example, the cache manager component 66 may be part of the network interface 62 code, or may be a separate component, (e.g., object, dynamic link library function and so on) that the network interface 62 and possibly other network applications may call on.

To store and retrieve cached files, the cache manager component 66 converts server references (URLs) to local file system filenames. Although URL names and the like provided by servers often resemble filenames, certain characters in the URL name may not be allowed in a particular file system, and thus appropriate characters are substituted as necessary. Also, the name may be decorated, say by a appending a number, to distinguish it from a file for a similar but different URL. The cache manager 66 handles the creation and removal of files and directories, and the opening, reading and writing files. To this end, the cache handling mechanism 66 accesses a table of cache information 71 or the like to maintain appropriate file names for interfacing with the file system APIs 68.

In accordance with one aspect of the present invention, the cache manager component 66 also selectively caches partial content that results from an incomplete download, such as due to an interruption. To this end, the network interface 64 maintains information such as in the table 71 that tracks the cached partial data, for example, its filename and optionally other desired file information that may expedite performance, such as the size in bytes of the partial content data. Then, as described in more detail below, when the application 60 requests content corresponding to partially cached content, the cache manager 66 along with a range request and response transformation mechanism 70 requests any missing range (or ranges) of content needed to complete the content in order to provide a full response. When the range of content is received at a socket 72, the mechanism 70 works with the cache manager 66 to combine the received range of content data with the partial cached data and transform the server's range response into a complete response that can be dealt with by the network application 60.

Figure 9:
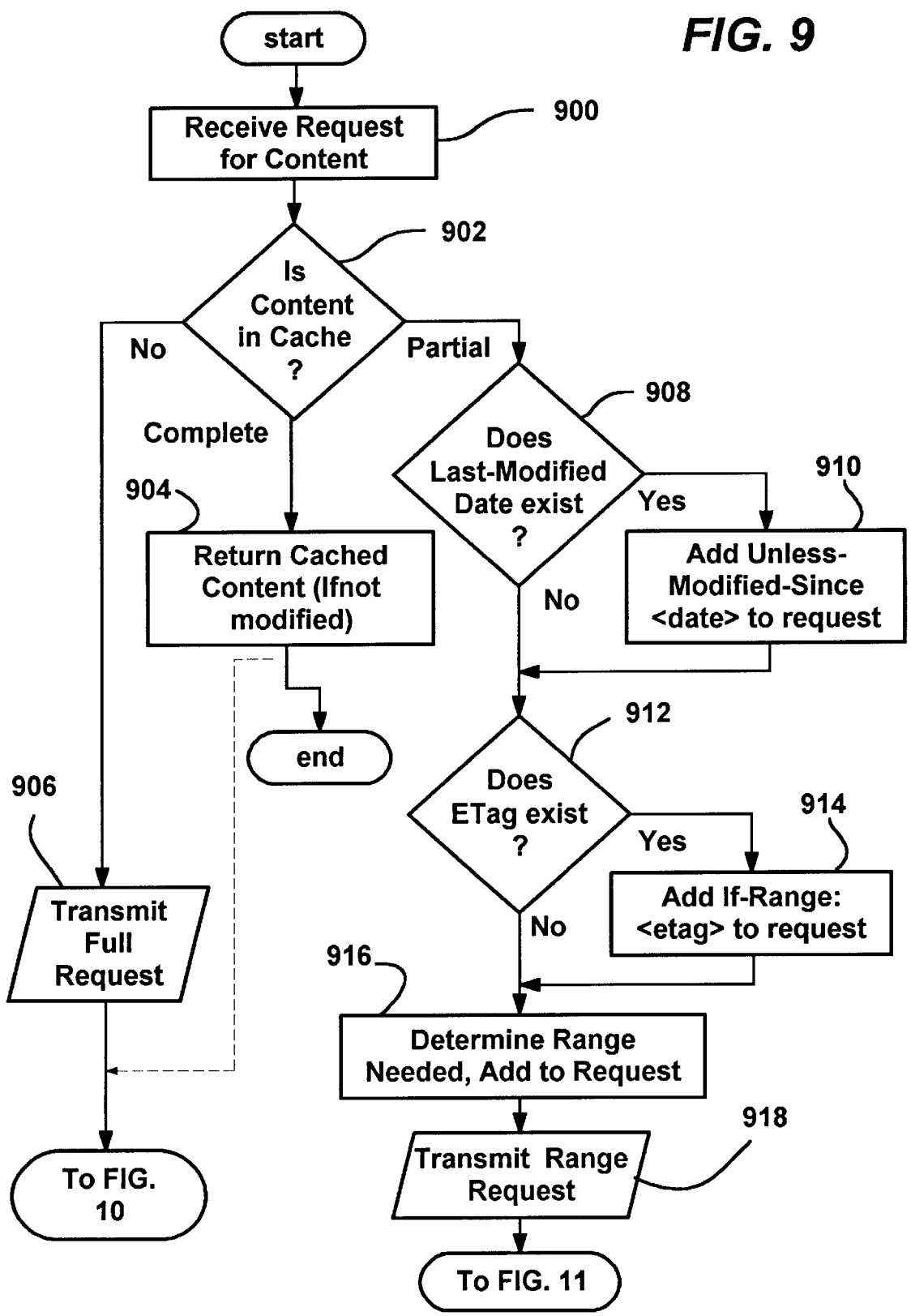
FIGS. 9–11 comprise a flow diagram generally representing the steps taken to provide responses to requests using partial file caching and read range resume in accordance with an aspect of the present invention.
Figure 10:
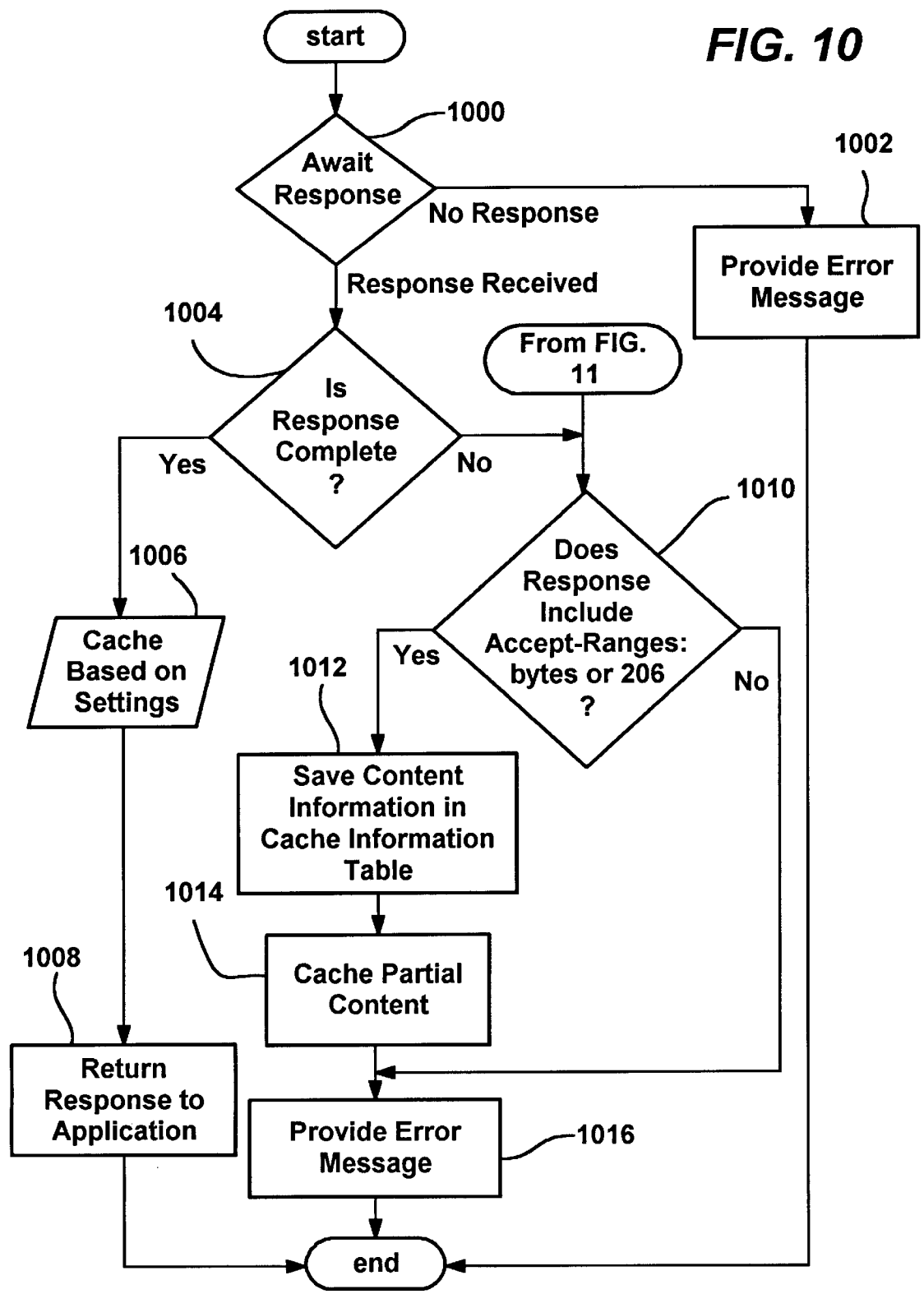
Figure 11:
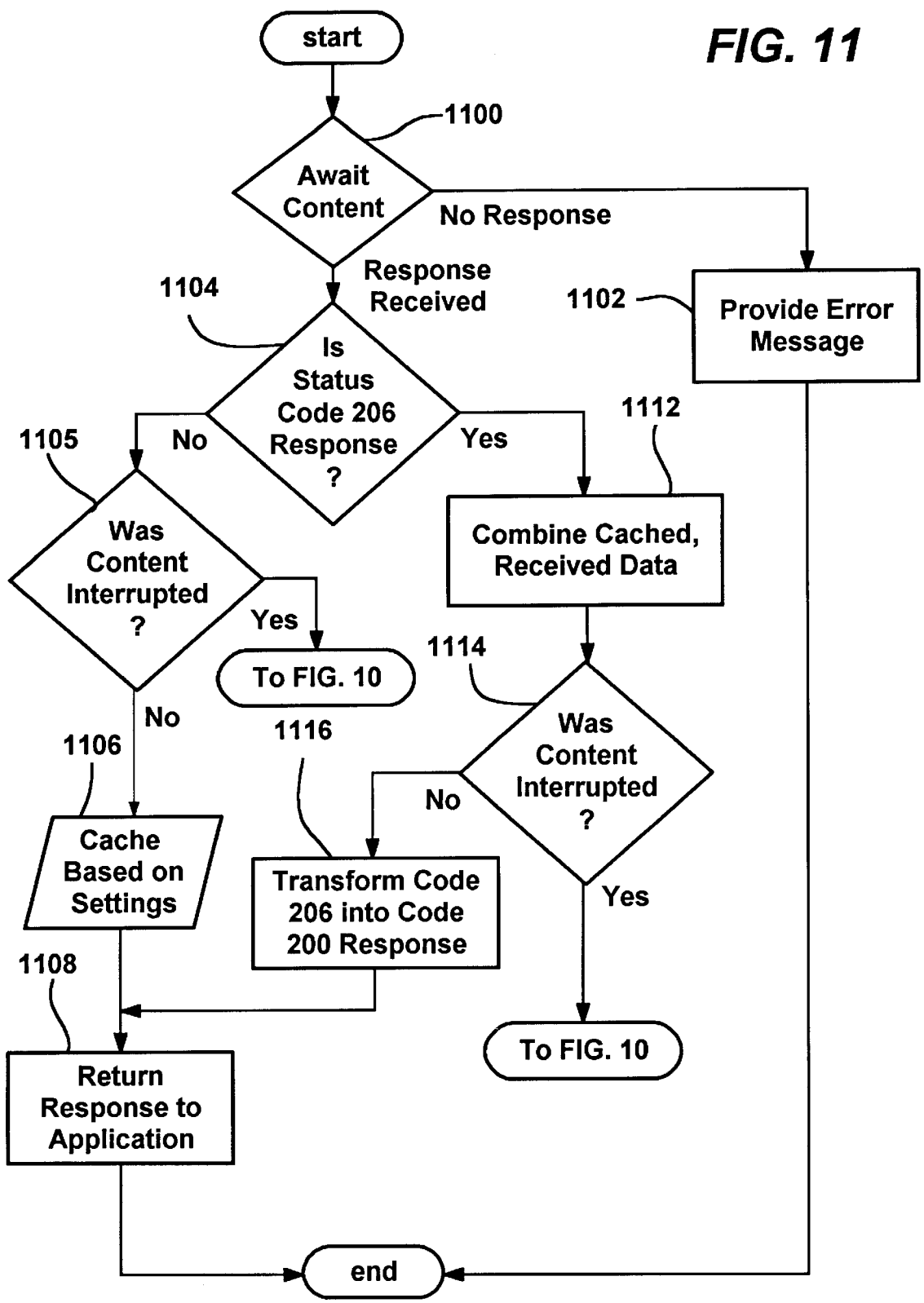

Turning to an explanation of the present invention with particular reference to FIGS. 4–8 and the flow diagrams of FIGS. 9–11, the network interface 62 begins the system and method of the present invention when it receives a request for content from the network application 60 (step 900 of FIG. 9). In general, the steps represented in FIGS. 9–11 for partial file caching and read range resume are implemented in the cache manager 66 and the range request and response transformation mechanism 70, which for purposes of simplicity are generally referred to herein as "the process." The request typically includes a uniform resource identifier (URI) identifying the desired content 64. In response, at step 902, the cache manager 66 looks in the table 71 (or the cache 70 itself) to determine if the requested content is cached. If at step 902, content is cached that properly satisfies the request, i.e., the full content, the process branches to step 904 wherein the full content is returned to the network application 62. Note that step 902 may include a validity check, e.g., a check of the coherency information possibly including an If-Modified-Since header, If-None-Match header, or other headers as appropriate, in the request to the server before branching to step 904. Thus, step 904 may return cached content (such as when not modified, e.g., server returns a 304 status) or the server may return content (e.g., a 200 status), whereby step 904 would branch to FIG. 10 (dashed line).

As a second possibility, none of the content will be in the cache 70 (or if in the cache 70, is not valid, e.g., stale) whereby the process will branch to step 906 and receive the entire content. FIG. 4 represents the initial "GET" HTTP request 84 sent in an attempt to retrieve the entire content. Note that FIGS. 4–8 are simply illustrative of requests and responses, and thus include combinations of HTTP versions.

The remaining possibility at step 902 is that, in accordance with one aspect of the present invention, there is a partial amount of the content stored in the cache 70. When partial content is cached, step 902 branches to step 908 to request (at least some of) the missing content, i.e., via a range request. Range requests are described below with reference to steps 908–918. For purposes of simplicity, the present invention will be primarily described with respect to a missing range of bytes that is contiguous, whereby a single request for the missing bytes may be made. As can be readily appreciated, however, a plurality of ranges may be requested and merged with the cached partial content, such as if non-contiguous portions of content are determined to be missing.

When a request for the full amount of content has been transmitted at step 906, the process continues to step 1000 of FIG. 10 to await the response. At step 1000, no response may be forthcoming, or at least some part of the request may be received. If no response is received, (e.g., the process is informed that the request timed out), step 1000 branches to step 1002 to provide any time-out error message or the like, as appropriate, and the process ends.

If a response is received, step 1000 branches to step 1004 wherein the request may be fully satisfied, or the request may have been partially satisfied before having been interrupted, such as if the user clicked on a new link in the middle of the transmission. Note that the actual response may be received in portions, whereby while waiting for the complete response, the process may return portions of the data to the network application 60 as it is received so that the application may begin using the data, e.g., to render the page. However, for purposes of simplicity herein, any response received will be treated as a single response, either complete or partial, with no more data to follow. Nevertheless, as will be readily understood, the present invention may handle multiple responses by looping back for each portion received, (e.g., to step 1000 of FIG. 10 or step 1100 of FIG. 11), until the entire response is received or a time-out/interruption is detected that indicates that no further response is forthcoming.

Thus, if at step 1000 data was received, step 1000 branches to step 1004 to test if the request was fully satisfied by the response. At step 1004, if the response was complete and the entire content was received, then step 1004 branches to step 1006 which caches (or chooses not cache) the full content based on the system settings or the like. For example, if the content is too large for the cache, it will not be cached. In any event, step 1008 then returns the data in the response to the application 60.

In accordance with an aspect of the present invention, if the response was not complete, (e.g., it was interrupted), then step 1004 branches to step 1010 to determine if the response may be partially cached. FIG. 5 represents an interrupted response 85, wherein the server was going to send 8000 bytes of content data but only sent the first 2000 bytes, i.e., bytes 0–1999 (decimal numbers are used herein for purposes of simplicity). Note that the response 85 indicates via a header that the total Content-Length header was 8,000 bytes, however only 2,000 bytes of data (bytes 0–1999) were received prior to the interruption.

Step 1010 tests to determine whether the response directly (or implicitly via a 206 response) indicates that the server is capable of accepting range requests. Most servers that are capable of handling range requests include an "Accept-Ranges: bytes" header. However, not all servers that can handle range requests do so in accordance with the HTTP/1.1 specification, e.g., some HTTP/1.0 servers handle range requests while others do not. In any event, although not necessary to the present invention, in the present example, step 1010 rejects the caching of partial content for those servers that do not indicate they can handle range requests via the "Accept-Ranges: bytes" header or via a 206 status. Similarly, if the response includes neither a strong ETag (entity tag starting with a quote character) nor a Last-Modified Date timestamp as described below, the partial content is treated as being not cacheable.

At shown in FIG. 5, in the present example, a partial response 85 is received that indicates via the "Accept-Ranges: bytes" header therein that the server which sent the response is capable of handling range requests. Thus, step 1010 branches to step 1012 wherein the partial content is given a filename, (in the same general way in which full content is named), and any desired information associated with the response 85 (e.g., the URI to filename and/or other metadata) is saved in the cache information table 71 so that the partial content may be located and later used. Step 1014 is then executed to cache this partial response, i.e., the cache manager 66 sequentially calls the file system APIs 68 with create file, write file and close file requests. As shown in FIG. 5, the partial response 85 further includes header information that is saved therewith, including information that may be used for coherency checking purposes. More particularly, the response 85 includes a "Last-Modified" date header and/or an "ETag" (entity tag) header that can be subsequently returned to the server for use by the server in determining whether the requested content has changed. The Last-Modified date header is a timestamp that directly indicates the time that the content was last changed, while the ETag is some number assigned by the server and associated with that instance of the content. For example, the ETag value can be a checksum or hash of the data, or a high-resolution (e.g., in milliseconds) timestamp. Regardless of how the server chooses to implement the Last-Modified Date and/or ETag content headers, this provides a mechanism via which the server may later determine whether requested content (which may be partial content) has been changed. Note that in a preferred implementation, if the response is HTTP/1.0, a Last-Modified time is required, while if HTTP/1.1, a strong ETag is required. However, either is sufficient as a coherency validator, and thus for purposes of clarity, both are shown in the drawings herein. Other header information may include a transmission length header that is used to keep the socket alive.

Lastly, as shown by step 1016, an error message or the like (e.g., the connection was dropped) may be returned to the application 60 to indicate that the full amount of content requested was initially requested but not received.

In keeping with the present invention, once partial content is cached, it may be used to reduce the amount of subsequent information that is downloaded. To this end, returning to a description of steps 908–918 of FIG. 9, if a request for content is received (step 900) and corresponding partial content is in the cache 70 (step 902), then step 902 branches to step 908. In accordance with one aspect of the present invention, the cached partial content (or information thereof) is accessed to construct a range request 86 (FIG. 6) that seeks the missing portion (i.e., a range or ranges) of the requested content. To construct such a range request, at steps 908–910, if it exists, the Last-Modified date timestamp is added to the request 86 (in an "Unless-Modified-Since: <date>" header), and similarly at steps 912–914, any ETag is added (in an "If-Range: <etag>" header). Note that if neither the Last-Modified timestamp header nor the ETag header is available, a full request may alternatively be transmitted (step 906), although in the present implementation, content is not partially cached if neither header is available.

Next, at step 916, the missing range is determined and added to the range request 86. Note that as described below, the missing range need not be the entire amount of content remaining, however for purposes of the present example the entire remaining amount is desired. Thus, as shown in FIG. 6, the range request 86 includes the "GET" request indicating the URI of the content, an "Unless-Modified-Since" header specifying the timestamp that was previously provided by the server as the content's timestamp, the "If-Range" header specifying the ETag, and other headers that would be transmitted for a full request. In addition, the missing range is specificied by a "Range" header, for example "Range: bytes=2000–" (open-ended) requested range, (2000–). Note that the range alternatively may have specified "bytes 2000–7999", since the full length was known, however not specifying an upper limit indicates that the request is seeking the range to the end of the content. The range request 86 is then transmitted to the server at step 918, and the process continues to step 1100 of FIG. 11 to await the response.

Step 1100 of FIG. 11 awaits the response, sending any portions of received data to the application 60 as it is received, (after transforming the response as described below). Moreover, once the partially cached data is verified as valid (i.e., coherent), the partially cached data is provided to the application 60 so that the application 60 may thereafter begin using the content (e.g., to render the page). Again, however, for purposes of simplicity it is assumed that the entire range response comes back at once, although in actuality portions of it may come back, whereby the portions may be handled by looping through the various steps.

Step 1104 first tests to determine if the response to the range request is a range response, in HTTP indicated by a 206 status code. If not, in the present example the server (or a proxy for the server) instead provides a full content (HTTP code 200) response, such as when the server detected from the "Unless-Modified-Since" timestamp and/or the "If-Range" ETag that the requested content had changed since the partial content was cached. The server may also provide a full content (code 200) response if it does not understand the range request 86. In any event, if a full content (code 200) response is received instead of the range (code 206) response, step 1104 branches to step 1105 to test if the response was interrupted, and if interrupted, step 1105 branches to FIG. 10, or if full, branches to steps 1106–1008 to cache the full response (based on the system settings) and return the response to the application 60. Note that HTTP network applications are capable of handling such code 200 responses. Moreover, it should be noted that before a 206 response is received from the server, the interface 62 may receive and process other response codes, and possibly retry the request. For example, a request may result in a 302 status code being received, which redirects to another URL, or a 401 status code, which causes the collection of a username and password, and a retry of the request. In any event, there may be a number of intermediate status codes before the 206 status is received, however for purposes of simplicity herein, such intermediate codes will not be further described.

If the response is a range response comprising the requested range of bytes, step 1104 branches to step 1112 wherein the process merges the partial data from the cache with the received range data. As shown in the returned range response 87 of FIG. 7, the returned range (2000–7999) is set forth in the range response 87, along with the Content-Length header indicating the number of bytes returned (6000) and coherency headers. Step 1114 tests to determine if this transmission was interrupted, in which event the process returns to step 1010 of FIG. 10 to cache any of the partially received data, as merged with the cached data, for possible future use. For example, if only bytes 2000–6999 were received prior to the interruption, the client machine now possess bytes 0–6999 (including bytes 0–1999 from the cache) and thus can cache more of the partial content than before.

If uninterrupted range content data is received, such as shown in the response 87 of FIG. 7, the full amount of content is now available at the client. However, the client application 60 most likely is unable to handle a code 206 range response. Thus, in accordance with another aspect of the present invention, at step 1116 the response is transformed by the response transformation mechanism 70 into a code 200 response that the network application 60 understands. To this end, as shown in the transformed response 88 of FIG. 8, the status code is changed to 200, and the "Accept-Ranges: bytes" header is added in case the application 60 can use this information. Note that the "Accept-Ranges: bytes" header is implicit in a code 206 response, and thus may be omitted by some servers. Also, in the transformed response 88, the "Content-Length" header is changed to the total length of the merged content, 8000 bytes, and the "Content-Range" header is removed. As can be readily appreciated, the partial caching is thus essentially invisible to the network application 60, which expects and receives the full amount of requested data via a code 200 response (or progressively via a number of code 200 responses). At the same time, less data is transmitted by the server whenever possible, thus reducing client latency and server load while reducing network utilization.

Figure 12:
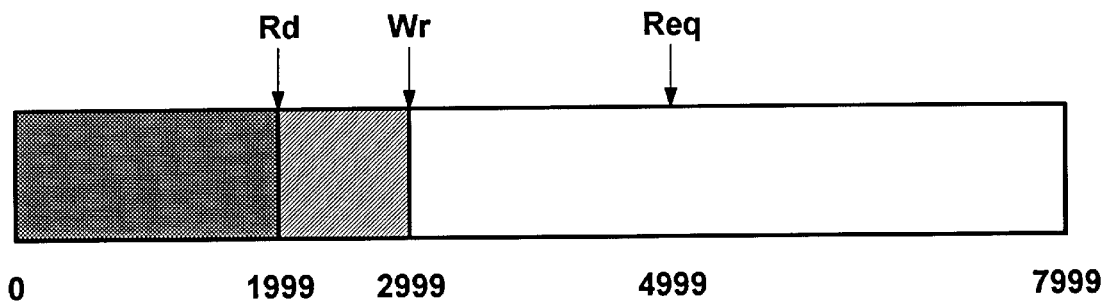
FIGS. 12 and 13 are representations showing the data of partially downloaded content files and pointers thereto for providing the data to an application with apparent random access in accordance with another aspect of the present invention.
Figure 13:
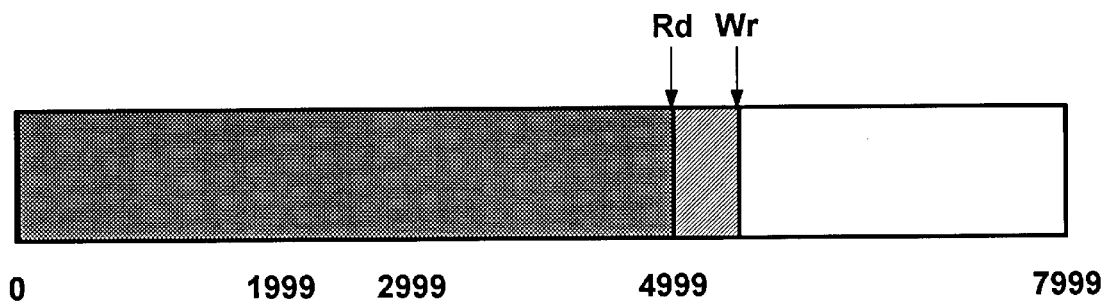

In accordance with another aspect of the present invention, applications which request network content via a file-like interface may now be given the illusion of having random access to that content. For example, an application may request a certain range of bytes and receive only those bytes, either from the cache or via a downloading operation. To accomplish this "random access" illusion, separate pointers may be used to track the location that the client is requesting to access (i.e., "read"), and the location in the content that has been written to the cache 70. In other words, the application's read pointer is de-coupled from the internal write pointer. FIGS. 12 and 13 represent how the illusion of random access may be accomplished via the content cached in the file system and data received at the socket 72 in response to requests.

As shown in FIG. 12, a client application has so far requested bytes 0–1999 of some particular content, although as will be readily appreciated, there is no requirement that these bytes start at the beginning of the content nor be in any sequential range. In response, the network interface 62 obtains the content read and write pointers, and determines that the requested bytes are already present on the client machine, i.e., cached. Note that the write pointer may be derived from the cached data, and thereafter the read and write pointers may be maintained in a storage 90 therefor. Once the client makes the request, the interface 62 supplies as much as it can from the cached data, (for example after using any coherency information and an if-modified-since request as desired to ensure that the cached data is current), and moves the read pointer accordingly. Note that the content at the server may change between range requests, and thus the coherency information is checked during each request via the timestamp and/or ETag.

As also shown in FIG. 12, the client has next requested to read up to byte 4999, such as by requesting to read the next 3000 bytes. However, the requested data is not all cached, and thus as shown in FIG. 13, the network interface 62 requests a further range of data, and merges the cached data with the data received at the socket 72 to respond to the client application's request. Note that the socket data may be first written to a cache file of the file system, and then read as if it was previously cached, or alternatively may be used directly. Moreover, as shown in FIG. 13, more data than that requested by the client may be requested from the server. For example, for purposes of efficiency, it may be worthwhile to request a larger block of data (e.g., one-thousand bytes) than a smaller block (e.g., twenty bytes). Indeed, the server may transmit more data than actually requested, in which case it may be cached in accordance with the present invention.

Moreover, the network interface may anticipate demand. For example if the client application requests bytes 5000–7500 and the content is 8000 bytes long, the network interface 62 may request the additional 500 bytes and cache those bytes for likely future use. Lastly, the interface 62 may coalesce multiple requests into fewer requests of the server, e.g., if the client requests bytes 2110–2130, 2140–2190 and 2210–2230, the interface may request bytes 2110–2230 or some larger range in a single request to the server, and then selectively return only those bytes requested to the application 60.

Lastly, a more sophisticated application may be written to inform the interface 62 that it wishes to handle actual responses from the server instead of transformed responses, or at least certain types of responses. In such an event, the interface 62 will allow the application to handle the appropriate responses.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computer system, a method of returning requested server content to an application, comprising the steps of, storing partial server content in a local cache, receiving a request for server content corresponding to the partial content, determining a range of content data including data that is missing from the partial content in the cache, requesting the range of content data from a server and receiving the range of data in response, merging the partial content in the cache with the range of content data received from the server into merged content, and returning the merged content to the application.

2. The method of claim 1 wherein the step of returning the merged content to the application includes the step of providing the merged content to the application in an HTTP response.

3. The method of claim 2 wherein the step of receiving the range of data includes the step of receiving an HTTP range response, and wherein the step of providing the merged content to the application in an HTTP response includes the step of transforming information of the range response.

4. The method of claim 3 wherein the step of transforming information of the range response includes the step of changing the value of at least one HTTP code therein.

5. The method of claim 1 wherein the step of storing partial server content in a local cache comprises the step of receiving less than a full amount of requested content from the server.

6. The method of claim 1 wherein the step of receiving a request for server content includes the step of receiving a uniform resource identifier from the application.

7. The method of claim 1 wherein the step of requesting the range of content data from the server comprises the step of specifying a first byte position based on the number of bytes of data in the partial content.

8. The method of claim 7 wherein the step of requesting the range of content data from the server further comprises the step of specifying an open-ended upper limit.

9. The method of claim 7 wherein the step of requesting the range of content data from the server comprises the step of further specifying a second byte position larger than the first byte position.

10. The method of claim 1 wherein the step of requesting the range of content data from the server comprises the step of providing If-Range header to the server.

11. The method of claim 1 wherein the step of requesting the range of content data from the server comprises the step of providing an Unless-Modified-Since header to the server.

12. The method of claim 1 wherein the step of receiving a request for server content includes receiving a request for a full amount of content from the application.

13. The method of claim 1 wherein the step of receiving a request for server content includes receiving a request for less than a full amount of content from the application.

14. The method of claim 13 further wherein the step of requesting the range of content data from the server includes the step of requesting content beyond that requested by the application.

15. The method of claim 14 further comprising the step of maintaining a first pointer to the amount of content data requested by the application and a second pointer to the amount of content data received from the server.

16. The method of claim 1 wherein the step of receiving a request for server content includes receiving a plurality of ranges of requested bytes from the application.

17. The method of claim 15 further comprising the step of coalescing the plurality of ranges into a single range request.

18. The method of claim 1 further comprising the steps of determining at least one other range of content data including data that is missing from the partial content in the cache, and requesting the at least one other range of content data and receiving the at least one other range of data in response.

19. In a computer system, a system for returning requested content of a server to an application, comprising, a local cache for storing partial content, an interface connected to the application for receiving a request therefrom for server content corresponding to the partial content, and a mechanism connected to the interface for determining at least one range of content data including data that is missing from the partial content in the cache, the interface requesting the at least one range of content data from the server and receiving requested content data in response, the mechanism merging the partial content in the cache with the requested content data received from the server into merged content, and the interface returning the merged content to the application.

20. The system of claim 19 further comprising a table for storing information of the partial files in the local cache.

21. The system of claim 19 further comprising a storage for storing a first pointer indicative of the amount of content returned to the application and a second pointer indicative of the amount of content received from the server.

22. In a computer system, a method of returning requested HTTP server content to an application, comprising the steps of, receiving partial server content, storing the partial server content in a local cache, receiving a request for server content corresponding to the partial content, determining a range of content data including data that is missing from the partial content in the cache, constructing an HTTP range request specifying the range of content data, transmitting the range request to a server, receiving an HTTP range response corresponding to the range request, transforming the range response into a complete response including data from the partial content in the cache and data from the range of content data received from the server, and returning the complete response to the application.

* * * * *

UNITED STATES PATENT AND TRADEMARK OFFICE
CERTIFICATE OF CORRECTION

PATENT NO. : 6,199,107 B1
DATED : March 6, 2001
INVENTOR(S) : Dujari et al.

It is certified that error appears in the above-identified patent and that said Letters Patent is hereby corrected as shown below:

Column 4,
Lines 27-28, "a appending a number" should read -- appending a number --.

Column 5,
Line 65, "or chooses not cache" should read -- or chooses not to cache --.

Column 6,
Line 29, "At shown" should read -- As shown --.

Column 7,
Line 37, "7999"," should read -- 7999," --.
Line 67, "steps 1106-1008" should read -- steps 1106-1108 --.

Column 8,
Line 26, "machine now possess" should read -- machine now possesses --.

Column 10,
Line 48, "further wherein" should read -- further, wherein --.

Signed and Sealed this

Sixteenth Day of November, 2004

JON W. DUDAS
*Director of the United States Patent and Trademark Office*